United States Patent [19]
Sauer et al.

[11] Patent Number: 5,301,597
[45] Date of Patent: Apr. 12, 1994

[54] HYDRAULIC CYLINDER

[75] Inventors: Herbert Sauer, Pfarrweisach; Oswald Muller; Karl Peuker, both of Ebern, all of Fed. Rep. of Germany

[73] Assignee: Fag Kugelfischer Georg Schafer KGoA, Fed. Rep. of Germany

[21] Appl. No.: 975,061

[22] Filed: Nov. 12, 1992

[30] Foreign Application Priority Data

Nov. 16, 1991 [DE] Fed. Rep. of Germany ....... 4137770

[51] Int. Cl.$^5$ .............................................. F15B 15/24
[52] U.S. Cl. .................................... 92/13; 92/60.5; 92/161; 403/28
[58] Field of Search .............. 92/60.5, 128, 169.1, 92/161, 13; 403/28, 29, 30, 265, 274, 367; 74/570

[56] References Cited

U.S. PATENT DOCUMENTS

| | | | |
|---|---|---|---|
| 3,072,423 | 1/1963 | Charlton | 74/570 |
| 3,159,086 | 12/1964 | Schwartz | 92/161 |
| 4,884,665 | 12/1989 | Parker et al. | 92/169.1 |
| 5,050,381 | 9/1991 | Matsuno et al. | 60/584 |

FOREIGN PATENT DOCUMENTS 3149628 12/1981 Fed. Rep. of Germany.
3813272 11/1988 Fed. Rep. of Germany ........ 403/30

*Primary Examiner*—Edward K. Look
*Assistant Examiner*—F. Daniel Lopez
*Attorney, Agent, or Firm*—Ostrolenk, Faber, Gerb & Soffen

[57] ABSTRACT

A hydraulic cylinder, preferably for use as a master or slave brake cylinder or in a hydraulic clutch system, maintains in a simple and inexpensive manner through the use of eccentric bushings the stroke length of the piston rod. The distance between the attachment lug and the attachment point determines the stroke length and is varied by adjusting the narrow tolerance of each bushing.

9 Claims, 1 Drawing Sheet

HYDRAULIC CYLINDER

BACKGROUND OF THE INVENTION

1. Field of the Invention

The present invention relates to a hydraulic cylinder having eccentric bushings. The hydraulic cylinder has an attachment lug and attachment points for connection with a motor vehicle, for example. The eccentric bushings are disposed in the attachment lug and the attachment points. More particularly, the eccentric bushings can be adjusted to vary the distance between the attachment lug and attachment points for a given position of the piston rod relative to the cylinder, so as to adjust the stroke of the piston rod.

2. Description of the Prior Art

Hydraulic cylinders having adjustable piston rods are known, for example, as disclosed in the German Unexamined Patent Application OS 31 49 628. In practice, however, a problem arises because the distance between the attachment lug and the point of attachment on the cylinder must be precisely maintained, since excessively long or short strokes resulting upon actuation can damage the unit, for instance, a clutch which is actuated by the piston rod. In order to avoid this, the piston rod lug is made adjustable by using a link rod head provided with a thread and fixed in position by a lock nut after adjustment. The adjustment process, however, has to be effected by hand which is cumbersome, time-consuming and expensive.

Another embodiment, in which the attachment lug is arranged directly on the piston rod, has the disadvantage that the distance between the attachment lug and the attachment point includes only very narrow tolerances and once again the adjustment process is very expensive.

SUMMARY OF THE INVENTION

It is therefore an object of the present invention to provide a hydraulic cylinder wherein the distance between the attachment lug and the attachment point can be precisely maintained with simple and inexpensive means.

In accordance with the invention, an adjustable cylinder comprises a housing and a piston rod movably disposed in the housing. The piston rod has a free end and an adjustable stroke length. An attachment lug is disposed on the free end of the piston. At least one attachment point is disposed on the housing at a spaced distance from the attachment lug. An eccentric bushing is arranged in each of the attachment lug and the at least one attachment point. Each bushing is capable of being adjusted to vary the stroke length of the piston rod.

By the arrangement of the eccentric bushings in the attachment lug and the attachment point, the length of the stroke of the piston rod can be maintained very precisely by tightening and subsequently form- or force-locking the eccentric bushings.

Other features and advantages of the present invention will become apparent from the following description of the invention which refers to the accompanying drawings.

DETAILED DESCRIPTION OF THE PREFERRED EMBODIMENT

Figure 1:
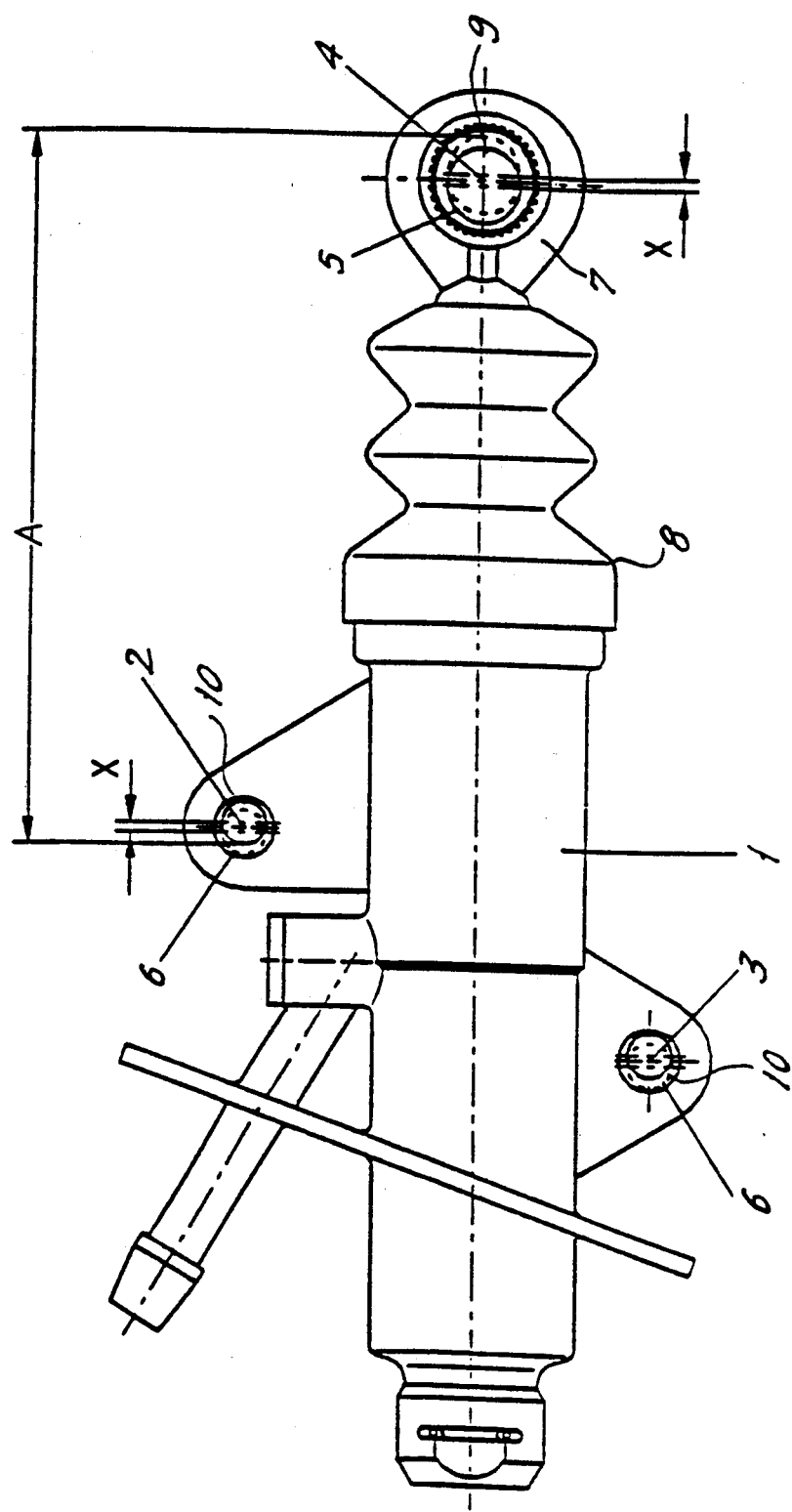
FIG. 1 is a side view of the hydraulic cylinder having eccentric bushings according to the invention.

As illustrated in FIG. 1, the cylinder includes a housing 1 and a piston rod, covered by hood 8. The piston rod is movably disposed within housing 1. The piston rod has an adjustable stroke length and is provided at its free end 7 with an attachment lug 4. The attachment lug 4 is connected, for example, to an actuating rod of a vehicle (not shown). One example of an actuating rod is the lever that releases a clutch, the clutch being thereby actuated by the cylinder.

On the housing 1, there are provided attachment points 2 and 3 for attaching the cylinder to the vehicle. The attachment point 2 is spaced a distance "A" from the attachment lug 4.

An eccentric bushing having a preset tolerance "x" is arranged in each of the attachment lug and the attachment points. Eccentric bushing 5 having bore 9 is arranged in attachment lug 4 and eccentric bushings 6 having respective bores 10 are arranged in attachment points 2 and 3.

In FIG. 1, the centers of the lug 4 and attachment points 2, 3 are shown in dashed lines. The centers of the eccentric bores 9 and 10 are offset from the centers of the lug and attachment points by the preset eccentricity x, as shown.

Suitable means (not shown) are received by the bushings to secure the cylinder and piston rod to respective parts of the vehicle. The bushings 5, 6 are rotatably secured in the lug and attachment points and can be tightened or loosened by conventional tools.

Due to the arrangement of the offset eccentric bushings 5, 6 in the attachment lug 4 and in the attachment points 2 and 3, the ultimate length of the stroke of the piston can be varied as desired. This stroke length is determined by the range of motion of the attachment lug 4 with respect to the attachment points 2, 3. By tightening or loosening each eccentric bushing 5, 6 in the region of the eccentricity, the distance can be varied according to the preset value of the narrow tolerances x. The distance is then set by locking the bushings.

By adjusting and form- or force-locking the eccentric bushings, the piston free end 7 can be extended or retracted longitudinally to lock the actuating rod in the precisely desired position, thus avoiding over- or under-retraction of the piston rod. A form-locked hold is one produced by interlocking components. Such a hold could be established by distributing cogs around the bushing. A force-locked hold is one produced by exterior forces (friction, gravity, etc.) acting on the joint. It could be established by forcing an oversized bushing into a bore in the housing.

When the parts are manufactured of plastic, the eccentric bushing is advantageously arranged in the attachment lug 4 or the attachment points 2, 3 by ultrasonics or hot embedment. For example, a portion of the housing cylinder at the free end of the piston rod is melted and the respective eccentric bushing is arranged therein. The melted plastic fuses around the bushing and holds it stationary.

The eccentric bushings, as shown on bushing 5, can be knurled or grooved on the outside diameter for aiding in the adjustment or locking of the piston rod. The grooves improve engagement between the eccentric bushing and the conventional tools used to loosen or tighten the bushings.

The hydraulic cylinder is preferably used as a master or slave brake cylinder or in a clutch system. However, many other variations and modifications and other uses will become apparent to those skilled in the art. It is preferred, therefore, that the present invention be limited not by the specific disclosure herein, but only by the appended claims.

What is claimed is:

1. An adjustable hydraulic cylinder, comprising:
   a housing;
   a piston rod movably disposed in the housing, the piston rod having a stroke length and a free end;
   at least one attachment point disposed on the housing;
   an attachment lug at the free end of the piston rod; and
   respective eccentric bushings arranged in the attachment lug and the at least one attachment point, wherein each of the respective eccentric bushings is adjustable so as to vary a distance between the at least one attachment point and the attachment lug to adjust the stroke length of the piston rod.

2. The adjustable hydraulic cylinder according to claim 1, wherein each respective eccentric bushing defines a narrow tolerance, and the stroke length of the piston is adjustable according to the narrow tolerance of each respective eccentric bushing.

3. The hydraulic cylinder according to claim 2, wherein the housing comprises a plastic material.

4. An adjustable hydraulic cylinder, comprising:
   a housing;
   a piston rod movably disposed in the housing, the piston rod having a stroke length and a free end;
   at least one attachment point disposed on the housing;
   an attachment lug at the free end of the piston rod; and
   respective eccentric bushings arranged in the attachment lug and the at least one attachment point, wherein each of the eccentric bushings has an outer diameter having one of grooves or teeth, and is adjustable so as to adjust the stroke length of the piston rod, and each of the respective eccentric bushings defines a narrow tolerance, and the stroke length of the piston rod is adjustable according to the narrow tolerance of each of the respective eccentric bushings.

5. An adjustable hydraulic cylinder, comprising;
   a housing;
   a piston rod movably disposed in the housing, the piston rod having a stroke length and a free end;
   at least one attachment point disposed on the housing;
   an attachment lug at the free end of the piston rod, wherein each attachment lug and attachment point includes a melted portion formed by ultrasonics; and
   a respective eccentric bushing pressed into the melted portion of each of the at least one attachment point and the attachment lug, each respective bushing being adjustable so as to adjust the stroke length of the piston rod, and wherein each respective eccentric bushing defines a narrow tolerance, and the stroke length of the piston rod is adjustable according to the narrow tolerance of each respective eccentric bushing.

6. The hydraulic cylinder according to claim 5, wherein the housing comprises a plastic material.

7. An adjustable hydraulic cylinder including a piston with an adjustable stroke length, comprising:
   a housing;
   a piston rod movably disposed in the housing, the piston having a stroke length and a free end;
   at least one attachment point on the housing for attachment to a first point on a vehicle;
   an attachment lug at the free end of the piston rod for attachment to a second point on the vehicle, the second point being movable with respect to the first point; and
   respective eccentric bushings arranged in the at least one attachment point and the attachment lug, for interconnecting the same with the first and second points on the vehicle, respectively, each respective eccentric bushing being adjustable so as to vary a distance between the at least one attachment point and the attachment lug to adjust the stroke length of the piston rod.

8. An adjustable hydraulic cylinder, comprising:
   a housing;
   a piston rod movably disposed in the housing, the piston rod having a stroke length and a free end;
   at least one attachment point disposed on the housing;
   an attachment lug at the free end of the piston rod, wherein each attachment lug and attachment point includes a melted portion formed by hot embedment; and
   a respective eccentric bushing pressed into the melted portion of each of the at least one attachment point and the attachment lug, each respective bushing being adjustable so as to adjust the stroke length of the piston rod, and wherein each respective eccentric bushing defines a narrow tolerance, and the stroke length of the piston rod is adjustable according to the narrow tolerance of each respective eccentric bushing.

9. The hydraulic cylinder according to claim 8, wherein the housing comprises a plastic material.

* * * * *